(12) United States Patent
Nichols, III

(10) Patent No.: US 9,843,680 B1
(45) Date of Patent: Dec. 12, 2017

(54) SYSTEM AND METHOD FOR NATURAL LANGUAGE PROCESSING

(71) Applicant: Interactive Intelligence Group, Inc., Indianapolis, IN (US)

(72) Inventor: Jack Evans Nichols, III, Fishers, IN (US)

(73) Assignee: Interactive Intelligence Group, Inc., Indianapolis, IN (US)

( * ) Notice: Subject to any disclaimer, the term of this patent is extended or adjusted under 35 U.S.C. 154(b) by 0 days.

(21) Appl. No.: 15/279,038

(22) Filed: Sep. 28, 2016

(51) Int. Cl.
*H04M 3/00* (2006.01)
*H04M 5/00* (2006.01)
*H04M 3/51* (2006.01)
*G10L 15/26* (2006.01)
*G06F 17/27* (2006.01)
*H04M 3/42* (2006.01)
*H04M 3/523* (2006.01)

(52) U.S. Cl.
CPC ...... *H04M 3/5175* (2013.01); *G06F 17/2785* (2013.01); *G10L 15/26* (2013.01); *H04M 3/42221* (2013.01); *H04M 3/5158* (2013.01); *H04M 3/5166* (2013.01); *H04M 3/5191* (2013.01); *H04M 3/523* (2013.01)

(58) Field of Classification Search
CPC ............. H04M 3/5235; H04M 3/5183; H04M 3/5191; H04M 3/5166; H04M 3/5232
USPC ........... 379/265.07, 265.09, 265.13, 265.11, 379/265.05, 265.01, 242, 265.02
See application file for complete search history.

(56) References Cited

U.S. PATENT DOCUMENTS

| 8,767,948 B1 * | 7/2014 | Riahi | G06N 99/005 379/265.02 |
|---|---|---|---|
| 9,292,488 B2 * | 3/2016 | Mohajer | G06F 17/27 |

* cited by examiner

*Primary Examiner* — Thjuan K Addy
(74) *Attorney, Agent, or Firm* — Lewis Roca Rothgerber Christie LLP

(57) ABSTRACT

A system and method are presented for the use of natural language processing to automate the disposition of completed interactions in an environment such as a contact center system. Communications may be inbound or outbound. A communication is received or placed by the contact center system and processed through the contact center system. After the interaction of the communication and the contact center is completed, data from the completed interaction may be processed through an automated customer interaction disposition system. Transcript data from the interaction may be processed through an NLP engine to generate data from the interaction. The data may then be automatically matched with a disposition/wrap-up code for the interaction.

16 Claims, 3 Drawing Sheets

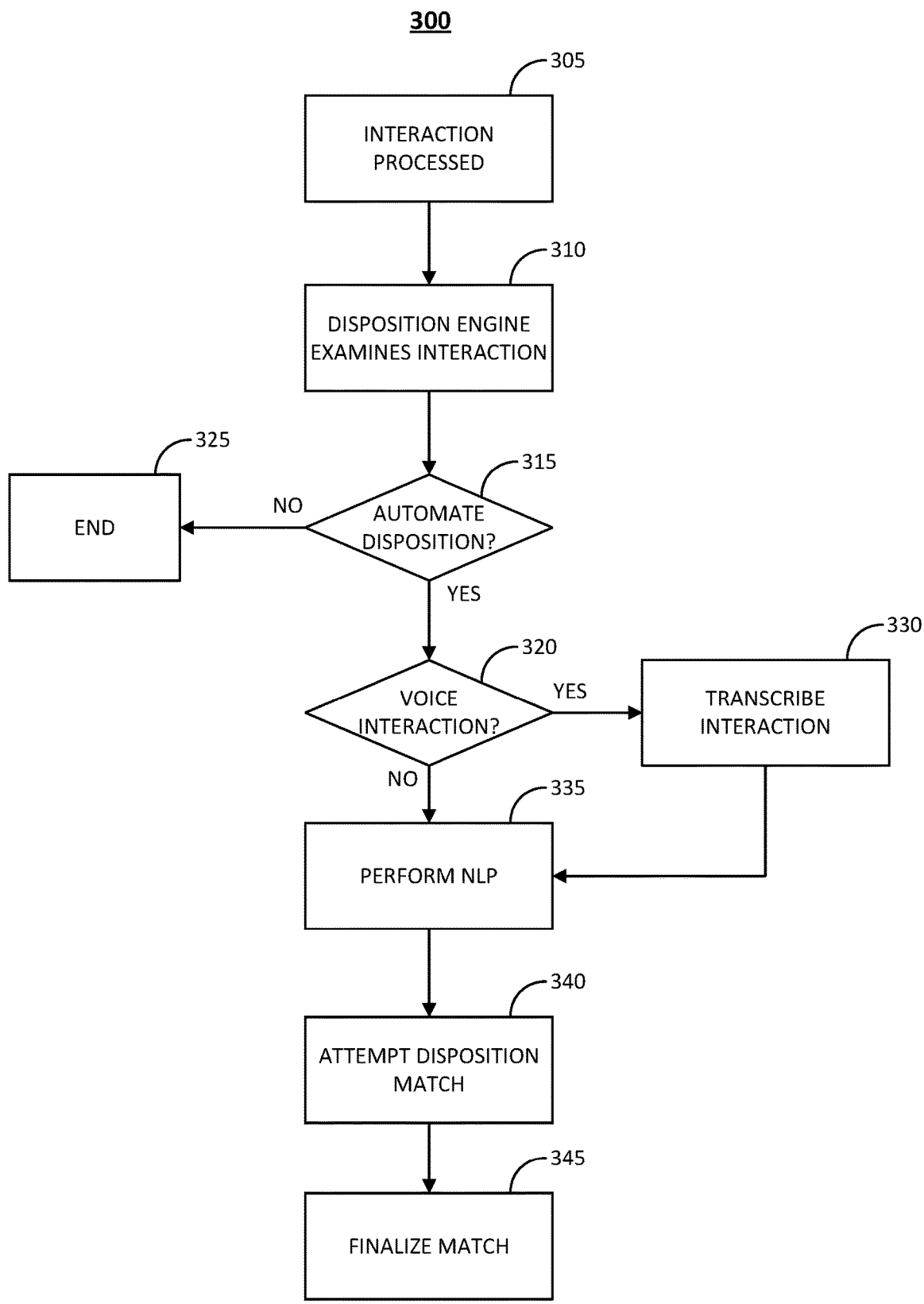

SYSTEM AND METHOD FOR NATURAL LANGUAGE PROCESSING

BACKGROUND

The present invention generally relates to telecommunications systems and methods, as well as natural language processing. More particularly, the present invention pertains to the disposition of completed interactions in telecommunications systems using natural language processing.

SUMMARY

A system and method are presented for the use of natural language processing to automate the disposition of completed interactions in an environment such as a contact center system. Communications may be inbound or outbound. A communication is received or placed by the contact center system and processed through the contact center system. After the interaction of the communication and the contact center is completed, data from the completed interaction may be processed through an automated customer interaction disposition system. Transcript data from the interaction may be processed through an NLP engine to generate data from the interaction. The data may then be automatically matched with a disposition/wrap-up code for the interaction.

In one embodiment, a method is presented for automating the disposition of interactions in a contact center system using natural language processing, wherein the system comprises a communication, an interactive voice response system, a recording module, an automated customer interaction disposition system, and a plurality of endpoints, the method comprising the steps of: receiving the communication by the interactive voice response system; recording, by the recording module, the interaction of the communication with the interactive voice response system; routing the communication to a desired endpoint from the plurality of endpoints; and after the interaction has ended, processing the communication, by the automated customer interaction disposition system, based on a defined communication flow from the interactive voice response system, wherein the automated customer interaction disposition system further comprises at least: a natural language processing engine, a disposition engine, a transcription service, a sentiment engine, and one or more databases.

BRIEF DESCRIPTION OF THE DRAWINGS

FIG. 3 is a flowchart illustrating a process for the disposition of an automated customer interaction.

DETAILED DESCRIPTION

Figure 1:
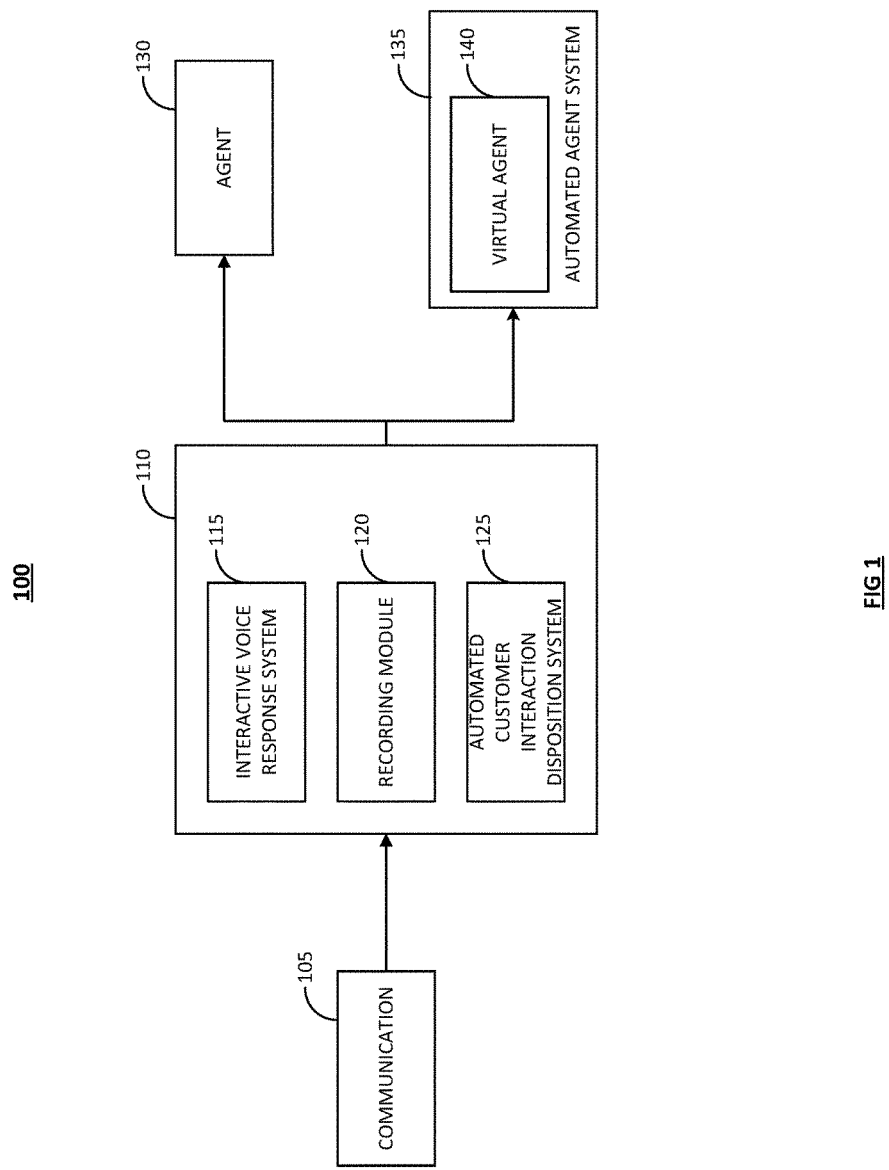
FIG. 1 is a diagram illustrating the basic components of an embodiment of a customer interaction system.

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

In a typical contact center system, once an interaction between a customer and an agent is completed, the agent might provide notes or information about the interaction. The notes regarding the interaction might further comprise information entered manually by the agent about the disposition of the interaction. For example, the disposition might comprise a short classification code on the purpose and/or the outcome of the interaction with the customer. Manually entering information by human agents often results in a lack of consistency of the interaction dispositions and can therefore lead to a lack of actionable information for the business utilizing the contact center system. Automating the disposition process removes the inconsistency inherent in the manual processes of entering disposition information about an interaction.

FIG. 1 is a diagram illustrating the basic components of an embodiment of a customer interaction system, indicated generally at 100. The basic components of an embodiment of a customer interaction system might include: a communication 105; a server 110 comprising an Interactive Voice Response System (IVR) 115, a recording module 120, and an automated customer interaction disposition system 125; and a plurality of end parties, such as one or more human agents 130, and an automated agent system 135 comprising a virtual agent 140.

A communication 105 comprises an inbound or an outbound communication. In a contact center environment, a customer may be placing a communication to the system. In another embodiment, an agent may also be receiving communications placed as part of an outbound dialing campaign by the contact center. Examples of communications 105 comprise phone calls, SMS, social media postings, email, video communications, instant messaging, etc., to name a few non-limiting examples.

The communication is received at the system server 110. The server 110 may be resident on-premises or may be resident in the cloud. The server 110 comprises at least an IVR system 115, a recording module 120, and an automated customer interaction disposition system 125. The communication 105 is routed to the IVR system 115, where the party placing the communication interacts with the IVR system 115 for further communication processing. The recording module 120 is responsible for recording the interaction from the time it is accepted in the system and as it progresses. Data from the recoding module 120 may be stored for use by the automated customer interaction disposition system 125. An examples of a recording modules might comprise Interactive Intelligence Group, Inc.'s Interaction Recorder or any other type of multi-channel recording and management product.

The communication 105 is routed accordingly to an end party based upon the interaction with the IVR system 115. The automated customer interaction disposition system 125 processes the communication 105 upon completion using data received from the recording module 120. The components of and the processing by the automated customer interaction disposition system 125 is described in greater detail below in FIGS. 2 and 3.

The end parties might comprise any number of human agents 130 and an automated agent system 135. The automated agent system comprises a virtual agent 140, which may handle the communication 105 automatically without a party having to wait for a human agent 130 to become available.

Figure 2:
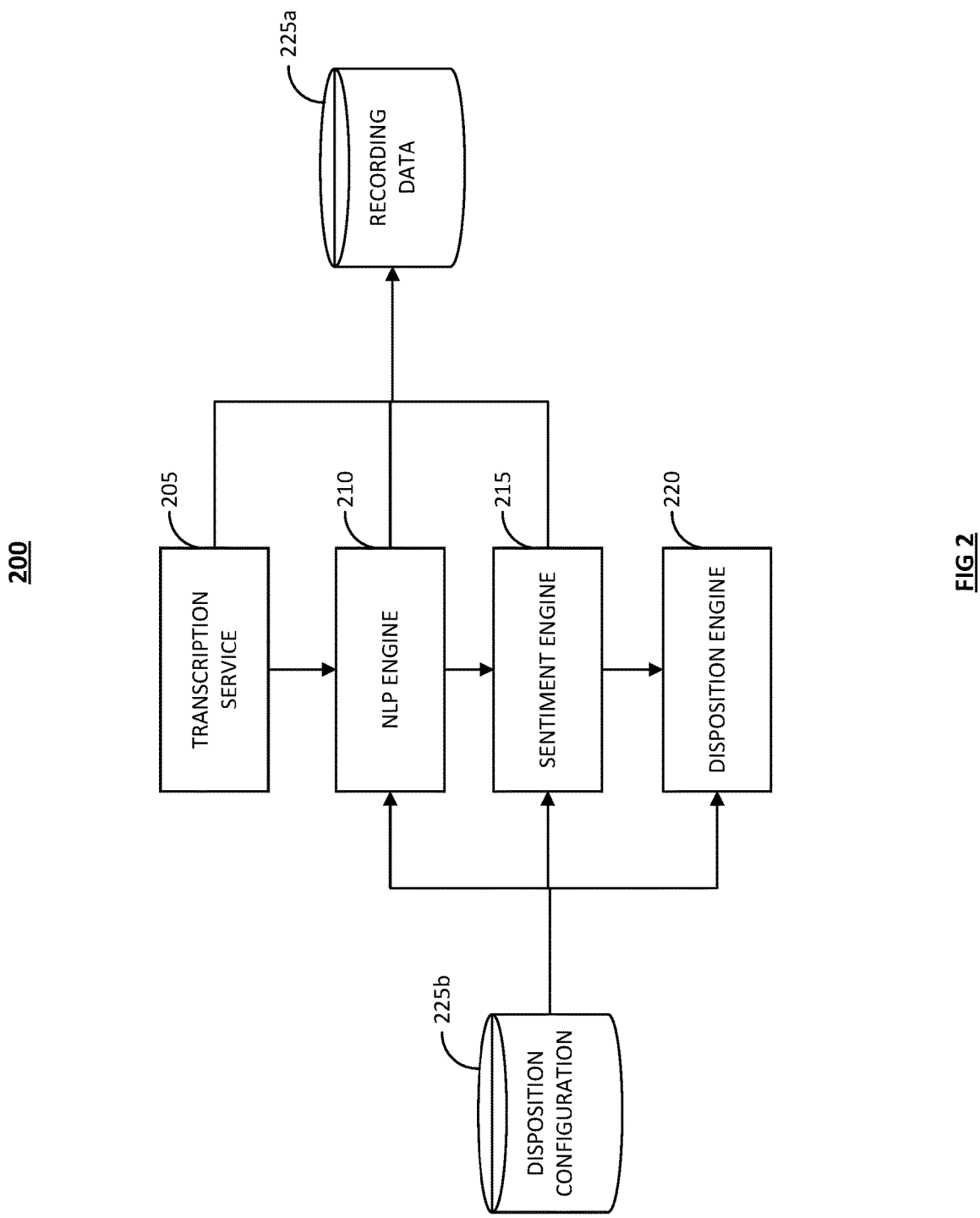
FIG. 2 is a diagram illustrating the basic components of an embodiment of an automated customer interaction disposition system.

FIG. 2 is a diagram illustrating the basic components of an embodiment of an automated customer interaction disposition system, indicated generally at 200. The basic components might include a transcription service 205, a natural language processing (NLP) engine 210, a sentiment engine 215, a disposition engine 220, and at least one database 225. In a non-limiting example, FIG. 2 illustrates a plurality of databases comprising a recording data database 225a and a disposition configuration database 225b. While two databases are illustrated here, it is within the scope of the embodiments described herein for any number of databases to be used.

The transcription service 205 transcribes a voice interaction and transforms the interaction into textual based information. The textual based information can then be examined by the NLP engine 210. Updates may be provided by the transcription service 205 to the database 225a comprising recording data. The NLP engine 210 processes textual based recordings and develops data about the interaction. The NLP engine 210 may also provide information to the recording data database 225a. The NLP engine may also receive information from the disposition configuration database 225b. Information from the NLP engine 210 may be used by the sentiment engine 215. The sentiment engine 215 uses NLP data to examine sentiments defined and attempts to match a disposition to the interaction. The sentiment engine 215 may also provide information to the recording data database 225a. The sentiment engine 215 may also receive information from the disposition configuration database 225b for use in processing interactions.

The disposition engine 220 works with the sentiment engine 215 to finalize a match of data from the interaction with a customer configured interaction disposition/wrap-up code. Data from the interaction might comprise information such as moods, emotions, demographics, personality insights, subject classifiers, etc., to name a few non-limiting examples. The disposition engine 220 may receive data from the disposition configuration database 225b.

FIG. 3 is a flowchart illustrating a process for the disposition of an automated customer interaction, indicated generally at 300. The process 300 occurs in the automated customer interaction disposition system 125 of the system 100.

In operation 305, a completed customer interaction is processed. For example, the customer interaction has completed and the completed interaction is sent to the disposition engine. The interaction may also be stored in a database for later processing. Control is passed to operation 310 and the process 300 continues.

In operation 310, an interaction is examined by a disposition engine. For example, interaction disposition configurations are received by the disposition engine, which uses this information to further process the interaction. Configurations might comprise ACD queues to disposition and the dispositioning rate of the interactions (e.g., all or only a percentage). Control is passed to operation 315 and the process 300 continues.

In operation 315, it is determined whether the disposition can be automated. If it is determined that the disposition can be automated, control is passed to operation 320 and the process 300 continues. If it is determined that the disposition cannot be automated, control is passed to operation 325 and the process 300 ends.

The determination in operation 315 may be based on any suitable criteria. For example, the ability of a disposition to be automated may be based on how the customer interacts with the IVR system and the communication is subsequently routed through the contact center system. The automation of the disposition of the interaction may also be based on contact center settings as well as whether the interaction itself will be capable of undergoing natural language processing.

In operation 320, it is determined whether the interaction comprises a voice interaction. If it is determined that the interaction comprises a voice interaction, control is passed to operation 330 and the process 300 continues. If it is determined that the interaction does not comprise a voice interaction, control is passed to operation 335 and the process 300 continues.

The determination in operation 320 may be based on any suitable criteria. For example, the file recording type may be used to determine if the interaction comprises a voice interaction.

In operation 330, the interaction is transcribed. For example, the interaction is turned into textual based information by a transcription service, capable of performing speech to text transcription. The transcribed interactions may be stored in databases or also provided to customers as part of the overall service. Control is passed to operation 335 and the process 300 continues.

In operation 335, natural language processing is performed. For example, the textual based recordings may be processed and data developed about the interaction. Natural language processing may be performed by the engine as described in FIG. 2 at 210 using information from the disposition configuration database. Information from the natural language processing may also be provided to the databases in the system comprising recording data. Control is passed to operation 340 and the process 300 continues.

In operation 340, sentiments of the interaction are defined. For example, a sentiment engine may use the NLP data to examine defined sentiments. Examples of defined sentiments might comprise a disposition code of "canceled service—unhappy" or "canceled service—opportunity". Further data may also be used for a disposition code, such as in the case of "canceled service—unhappy", the following information may be provided: Classifier: Cancelation; Type: Service; Sentiment: Negative; Emotion: Anger or Disgust. For "canceled service—opportunity", the following information may be provided: Classifier: Cancelation; Type: Service; Sentiment: Positive or Neutral; Emotion: NOT Anger or NOT Disgust Recording data may also be examined. Control is passed to operation 345 and the process 300 continues.

In operation 345, a match is finalized and the process 300 ends. For example, a proposed disposition match may be finalized by the disposition engine using data from the disposition configuration database.

While the invention has been illustrated and described in detail in the drawings and foregoing description, the same is to be considered as illustrative and not restrictive in character, it being understood that only the preferred embodiment has been shown and described and that all equivalents, changes, and modifications that come within the spirit of the invention as described herein and/or by the following claims are desired to be protected.

Hence, the proper scope of the present invention should be determined only by the broadest interpretation of the appended claims so as to encompass all such modifications as well as all relationships equivalent to those illustrated in the drawings and described in the specification.

The invention claimed is:

1. A method for automating the disposition of interactions in a contact center system using natural language processing, wherein the system comprises a communication, an interactive voice response system, a recording module, an automated customer interaction disposition system, and a plurality of endpoints, the method comprising the steps of:
  a. receiving the communication by the interactive voice response system;
  b. recording, by the recording module, the interaction of the communication with the interactive voice response system;
  c. routing the communication to a desired endpoint from the plurality of endpoints; and
  d. after the interaction has ended, processing the communication, by the automated customer interaction disposition system, based on a defined communication flow from the interactive voice response system,
    i. wherein the automated customer interaction disposition system further comprises at least: a natural language processing engine, a disposition engine, a transcription service, a sentiment engine, and one or more databases.

2. The method of claim 1, wherein the communication comprises an inbound communication.

3. The method of claim 1, wherein the communication comprises an outbound communication.

4. The method of claim 1, wherein the communication comprises at least one of: a telephone call, an SMS, a social media posting, an email, a video communication, and an instant message.

5. The method of claim 1, wherein the recording begins when the interaction has been received into the contact center system.

6. The method of claim 1, wherein the desired endpoint comprises a human agent.

7. The method of claim 1, wherein the desired endpoint comprises an automated agent system, wherein the automated agent system further comprises a virtual agent.

8. The method of claim 1, wherein the one or more databases house disposition configurations and recording data.

9. The method of claim 1, wherein the step of processing further comprises the steps of:
  a. examining, by the disposition engine, the communication to determine if a disposition of the interaction may be automated, wherein if the disposition may be automated, continuing to the next step, otherwise, ending the process;
  b. examining, by the disposition engine, the communication for voice, wherein if the communication is determined to comprise voice, transforming the communication into textual based information and updating recording data;
  c. sending the communication to a natural language processing engine;
  d. processing, by the natural language processing engine, the textual based information;
  e. examining defined sentiments, by the sentiment engine, and attempting to matching the communication to a disposition; and
  f. finalizing an attempted match using results from the sentiment engine and disposition configuration data.

10. The method of claim 9, wherein the disposition engine uses disposition configuration data to examine the communication.

11. The method of claim 9, wherein the transforming of step (b) is performed using a transcription service.

12. The method of claim 9, wherein the determination of voice is performed by examination of file media types of the communication.

13. The method of claim 9, wherein the processing of step (d) further comprises:
  a. developing data about the interaction using disposition configuration data; and
  b. updating the recording database.

14. The method of claim 13, wherein the data comprises at least one of: meta data and attributes of the interaction.

15. The method of claim 9, wherein the examining of step (e) uses one or more of: natural language processing data and artificial intelligence.

16. The method of claim 9, wherein step (e) further comprises updating the one or more databases associated with recording data.

* * * * *